Feb. 7, 1967  F. M. GLASS  3,303,343
NEUTRON MONITOR AND BURST DETECTOR
Filed July 28, 1964
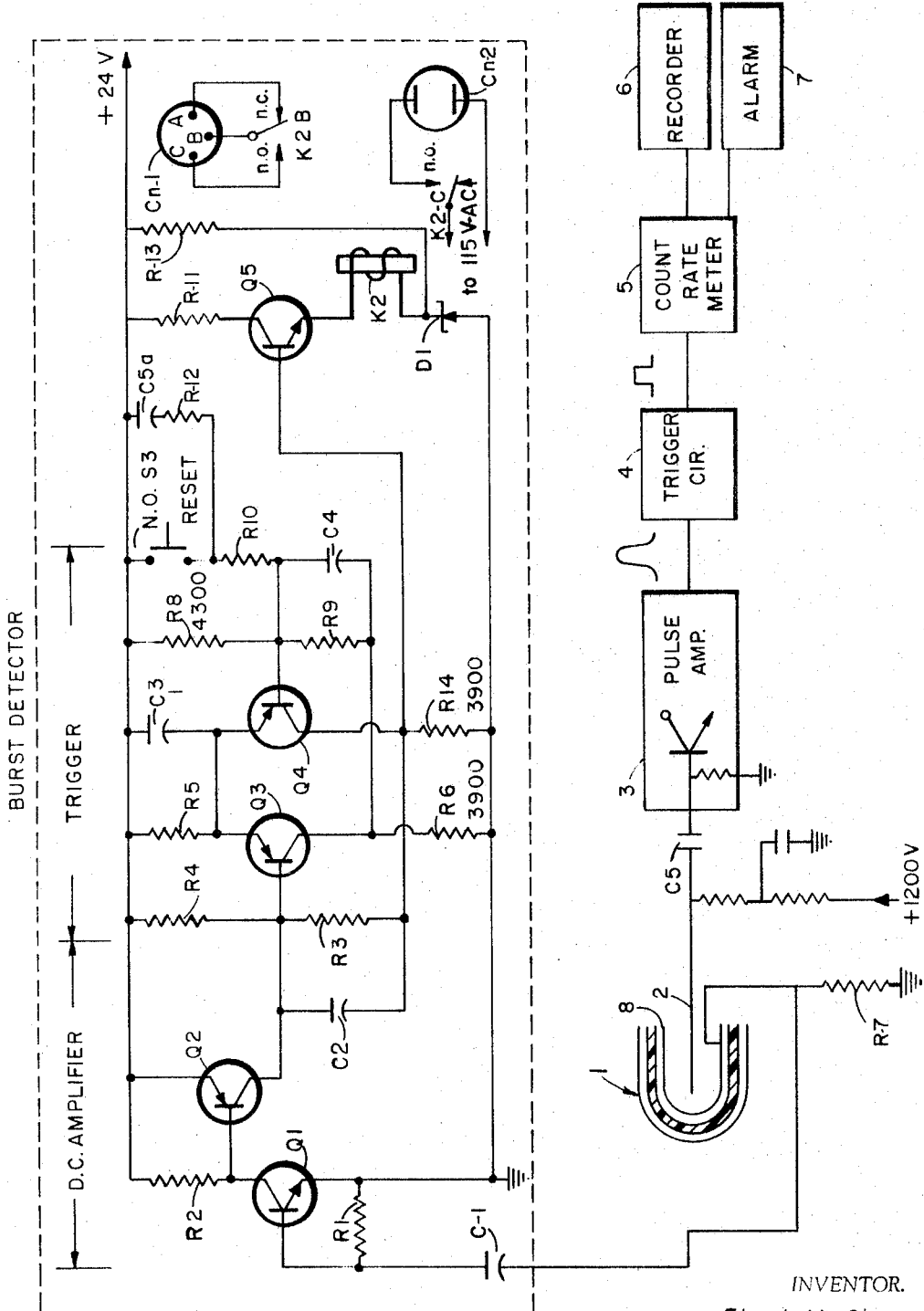
INVENTOR.
Floyd M. Glass
BY
Roland G. Anderson
ATTORNEY.

3,303,343
NEUTRON MONITOR AND BURST DETECTOR
Floyd M. Glass, Oak Ridge, Tenn., assignor to the United States of America as represented by the United States Atomic Energy Commission
Filed July 28, 1964, Ser. No. 385,812
2 Claims. (Cl. 250—83.1)

This invention relates to systems for monitoring neutron radiation and more particularly to a system for continuously monitoring neutron dose rate associated with a circuit for detecting a neutron burst or a fast excursion in dose rate such as may correspond to a critical incident.

It has long been the practice to measure thermal neutron dose rate with a pulse amplifier and count rate meter fed by a proportional counter. However, in ORNL Report 3378, page 32, dated January 29, 1963, a proportional counter using $B^{10}F_3$ gas and surrounded by a cylinder of high density polyethylene serving as a moderator, and a cadmium shield surrounding the moderator is employed to detect fast neutrons. With the cadmium shield removed, the moderator detects both fast and thermal neutrons. With both moderator and shield removed, only thermal neutrons and a few fast neutrons will be detected. The Report also suggests the desirability of associating the conventional dose rate measuring circuit with a neutron burst detecting circuit. However, no circuits are disclosed and no means for associating them are described.

It should be pointed out that in the conventional pulse amplifier and count rate meter dose measuring circuit, response is limited to gradual changes in dose rate meter rather than to a fast excursion such as may develop from a rapid rise in neutron flux level or a critical event. The fast neutron excursion will tend to paralyze this circuit and produce no response.

Since fast excursions may create a serious health hazard to personnel located in the area, it is important that they be timely warned when this happens.

Applicant with a knowledge of these problems of the prior art has as a primary object of his invention the provision of a burst detector circuit, and then as a minor secondary object the idea of connecting it to a conventional dose rate measuring circuit.

Other objects and advantages of my invention will appear from the specification and the accompanying drawing, and the novel features thereof will be particularly pointed out in the annexed claims.

The single figure is a circuit diagram of my improved system for detecting fast excursions in neutron flux as well as neutron dose rate.

Referring to the drawing in detail, 1 is a proportional counter containing $B^{10}F_3$ gas such as described in ORNL Report 3378, supra, although it may take the form of any other suitable neutron-sensitive proportional counter. The anode 2 is maintained at a high D.C. voltage by any suitable conventional regulated power supply (not shown). The anode 2 is capacitively coupled to the first stage of a conventional plural stage transistor-type pulse amplifier 3 through capacitor C–5. After amplification the output pulse is fed to a trigger pair or univibrators 5 of conventional type which has but one stable state. When the signal fed to the trigger circuit 4 reaches approximately 400 millivolts, the circuit is triggered into operation producing a rectangular type of pulse at its output. The width of the pulse is determined by the constants of the circuit. The output pulse is clipped and is fed by direct coupling into the count rate meter circuit 5. This latter circuit is normally cut off and is turned on for the duration of the pulse supplied from the trigger circuit 4. Therefore, the average current flowing in circuit 5 is a function of the number of pulses occurring over any given time. The usual recorder 6 is fed by the count rate meter 5, and the alarm 7 is coupled thereto and is actuated when the dose rate exceeds a predetermined value.

In the usual neutron dose rate measuring system, the cathode or shell 8 of the detector 1 is connected directly to ground. However, applicant has inserted a resistor R–7 of the order of 1 megohm in the ground circuit of the detector 1 for the purpose of providing a second signal (the product of the detector current and the resistance of resistor R–7). The insertion of this resistor permits separation of the neutron burst detector circuit, to be described, from the conventional pulse amplifier pulse rate meter dose rate circuit, described above. The signal for the burst circuit is picked off resistor R–7, of suitable size and fed to the burst circuit through capacitor $C_1$. Resistor R–1 in parallel with the base impedance of $Q_1$ and capacitor C–1 serves as the differentiating network or high pass filter which is responsive to signals having a fast rise time and is relatively unresponsive to signals having a slow rise time. The differentiation time constant may be varied to provide the desired response by selecting the proper value of C–1. The time constant may be as short as 200 μsec. when the instrument is used for monitoring a neutronic reactor having a short "period," or be as long as 350 msec. (.035 sec.) when used in a storage area where an excursion would have a relatively long "period."

The burst detector circuitry consists of a two-stage direct coupled amplifier $Q_1$, $Q_2$, a bi-stable trigger pair of flip-flop circuit with transistors $Q_3$, $Q_4$ and a normally biased off transistor $Q_5$ for energizing a relay. In the event of a critical incident, currents as high as 2 or 3 microamperes will flow through resistor R–7. The voltage across resistor R–7 is amplified by amplifiers $Q_1$ and $Q_2$ after having been differentiated by network $C_1$ and $R_1$ and applied to the base of transistor $Q_1$. The R–C time constant of this differentiating network $R_1$, $C_1$ which acts as high pass filter is chosen on the basis of passing the signal from a critical incident and rejecting the signal with slow rise time from the controlled start up of a reactor. The signal is positive at the base of transistor $Q_1$ and this gives a negative signal at the collector which is directly coupled to the base of transistor $Q_2$. This gives a positive signal at the collector of transistor $Q_2$ and this signal is directly coupled to the base of transistor $Q_3$. Transistors $Q_3$ and $Q_4$ form a flip-flop circuit with transistor $Q_3$ normally conducting and transistor $Q_4$ normally cut off. Positive signal of approximately one-half volt on the base of transistor $Q_2$ will trigger the flip-flop circuit to the other stable state. When transistor $Q_4$ is triggered to the conducting state, the potential of base $Q_5$ which is directly coupled to the collector of $Q_4$ rises sufficiently to energize the relay in the emitter circuit of transistor $Q_5$. The bleeder circuit R–13 and diode $D_1$ holds the emitter potential of transistor $Q_5$ sufficiently high to ensure that transistor $Q_5$ will remain cut off until the flip-flop triggers to the alarm state, i.e., when transistor $Q_3$ is cut off and transistor $Q_4$ is conducting. This state continues until manual reset switch $S_3$ is closed. When transistor $Q_5$ conducts, relay $K_2$ is energized to close contact K2C thereby providing power to receptacle CN2 and operate an alarm when a two-prong plug is plugged into receptacle CN2. It also moves the contact K2B from the N.C. position to the N.O. position to alter the circuit to the three prong receptacle into which a three-prong alarm circuit may be plugged.

In a perfectly symmetrical flip-flop circuit, the probability is that when turned off, there will be no choice between stable stages so that the circuit may re-energize on either stage $Q_3$ or $Q_4$. To ensure against false alarm on power failure, condenser $C_{5a}$ and resistor R–12 were incorporated in the circuit to provide momentary unbalance at the time power is first applied to the flip-flop circuit so it will assume the desired stable state each time.

Having thus described my invention, I claim:

1. A system for detecting neutron flux comprising a proportional counter responsive to neutrons for producing signals, a circuit directly coupled to the anode of said counter responsive to neutron flux to record dose rate and slow changes therein, a second circuit responsive to neutron burst and signals having a fast rise time, and means for coupling said last named circuit to the cathode of said counter, said coupling means including a differentiating network with a differentiating time constant in the range 200 to 280 $\mu$sec., coupled to the cathode of the counter to act as a high pass filter and pass only signals with a fast rise time to said second circuit.

2. In a neutron dose rate integrating device comprising a $B^{10}F_3$ counter shielded to lower the response to thermal neutrons provided with a cathode and an anode, a high voltage supply connected to said anode, an amplifier connected to said anode, a trigger circuit connected to said amplifier, and a count rate meter and alarm circuit connected to said trigger circuit, the improvement comprising a neutron burst detector comprising a high resistance resistor, means for connecting said resistor between ground and said cathode, means for insulating said cathode from the chassis of said counter, a second two-stage amplifier, means for connecting said cathode to the input of said second amplifier, a bi-stable trigger circuit connected to the output of said second amplifier, and an alarm device connected to the output of said bi-stable trigger circuit, said burst detector having a differentiation time constant falling in the range 200 to 280 $\mu$sec. whereby a fast excursion resulting from a critical incident will provide a signal to said second amplifier to thereby actuate said trigger circuit to its other stable state for actuating said alarm device.

No references cited.

ARCHIE R. BORCHELT, *Primary Examiner.*